United States Patent
Lubenski et al.

(10) Patent No.: US 11,924,688 B2
(45) Date of Patent: *Mar. 5, 2024

(54) ROLE ASSIGNMENT FOR CACHING CONTENT AT NETWORK NODES

(71) Applicant: Parallel Wireless, Inc., Nashua, NH (US)

(72) Inventors: Zeev Lubenski, North Andover, MA (US); Sumit Garg, Hudson, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,527

(22) Filed: Oct. 26, 2021

(65) Prior Publication Data
US 2022/0053378 A1    Feb. 17, 2022

Related U.S. Application Data

(63) Continuation of application No. 16/298,072, filed on Mar. 11, 2019, now Pat. No. 11,159,984.

(60) Provisional application No. 62/641,955, filed on Mar. 12, 2018.

(51) Int. Cl.
| | | |
|---|---|---|
| H04W 28/14 | (2009.01) | |
| H04W 36/08 | (2009.01) | |
| H04W 48/00 | (2009.01) | |
| H04W 76/11 | (2018.01) | |
| H04W 84/20 | (2009.01) | |

(52) U.S. Cl.
CPC .......... *H04W 28/14* (2013.01); *H04W 36/08* (2013.01); *H04W 48/17* (2013.01); *H04W 76/11* (2018.02); *H04W 84/20* (2013.01)

(58) Field of Classification Search
CPC .............................. H04W 28/14; H04W 76/11
See application file for complete search history.

(56) References Cited

U.S. PATENT DOCUMENTS

| | | | | |
|---|---|---|---|---|
| 2006/0120326 A1* | 6/2006 | Takeuchi | ............... | H04W 36/02 370/428 |
| 2013/0003708 A1* | 1/2013 | Ko | ........................... | H04W 4/18 455/436 |
| 2015/0222536 A1* | 8/2015 | Bergman | ................ | H04L 43/16 709/224 |
| 2015/0223114 A1* | 8/2015 | Tian | .................. | H04W 28/0268 370/235 |

\* cited by examiner

*Primary Examiner* — Sulaiman Nooristany
(74) *Attorney, Agent, or Firm* — Michael Y. Saji

(57) ABSTRACT

A system, method, and computer program are disclosed to provide an ad-hoc network of network nodes of caching content at the network nodes. A coordination server performing as a manager or controller determines the network node to cache content for a group of user equipments (UEs) attached to a first base station. The coordination server reassigns the network node that cache the content for the group of UEs when a user equipment (UE) moves from the first base station to a second base station.

20 Claims, 11 Drawing Sheets

ROLE ASSIGNMENT FOR CACHING CONTENT AT NETWORK NODES

CROSS-REFERENCE TO RELATED APPLICATIONS

This application is a continuation of U.S. application Ser. No. 16/298,072, filed Mar. 11, 2019, which claims priority under 35 U.S.C. § 119(e) to U.S. Provisional Pat. App. No. 62/641,955, filed Mar. 12, 2018, each of which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. This document also hereby incorporates by reference U.S. patent application Ser. No. 14/822,839 in its entirety. The purposes for the above incorporations by reference include at least to provide detailed information about the features and functionality of the Parallel Wireless Converged Wireless System (CWS or RAN) and HetNet Gateway (HNG or (coordinator) products.

BACKGROUND

In a typical deployment scenario for a UniRAN in the operator network, a UniRAN could be functioning in either one of two possible modes of operation, as a gateway mode or as a mesh mode. In a gateway mode of operation, the gateway mode has access to an inter-connect network though which it establishes connectivity to the cloud. The inter-connection could either be wired or wireless (e.g. Long Term Evolution or LTE). In a mesh mode, the UniRAN has no direct connection to the core or infrastructure provider network. Its only means of connecting to the network is over mesh-links. Establishment of the mesh network is covered in other documents.

A video cache for the UE is generally implemented either as a master cache in the core network or as a split cache in the core network and radio access network (RAN). A master cache is where unencrypted data from the Packet Gateway (PGW) is visible or a Deep Packet Inspection (DPI) technique are used, reduces the latency as compared to the scenario where there is no cache or the cache is maintained at the content hosting site/server. However, this mode suffers from latency related problems.

A split cache in the core network and radio access network (RAN) is when the master cache as defined above is supported by a slave cache hosted at the serving eNodeB/RAN/AP where the UE is anchored. This technique addresses the latency issues experienced when just one level cache is maintained at the core. This can also work in case of a network where the eNodeB moves with the UE as in some vehicular implementations. However, this mode is limited to a macro eNodeB based network where handovers are extremely few as in the case of handover, the entire cache needs to be purged. This option does not work for a small cell network.

Currently, there is no way to implement video caching at the edge that can handle the flexibility requirements needed by our mesh. For example, video caching at any particular node in the mesh may be limited by insufficient number of intra-mesh links or insufficient bandwidth. Also, when mesh nodes enter and exit, a need exists to reallocate the mesh caching node.

SUMMARY OF THE INVENTION

The invention relates generally to caching in a wireless network and more specifically to caching for a UE attached to a base station when the UE roams to a new base station.

In a first embodiment, a method for caching content at mesh network nodes includes assigning a first network node as a primary slave caching node to cache content for a user equipment (UE) attached to a first base station. The method further includes determining the UE has moved from the first base station to a second base station. The method also includes determining whether the first network node should continue to act as the primary slave caching node for the UE after it has moved to the second base station and using the first network node as the caching node when the determination is that the first network node should continue to act as the primary slave caching node for the UE. The method further includes designating a second network node as the primary caching node to cache content for the UE attached to a second base station when the determination is that the first network node should not continue to act as the primary slave caching node for the UE.

In a second embodiment, a non-transitory computer-readable medium is disclosed, containing instructions which, when executed, causes one or more processors to perform operations for caching content at mesh network nodes. The computer readable medium includes instructions for assigning a first network node as a primary slave caching node to cache content for a user equipment (UE) attached to a first base station. The medium further includes instructions for determining the UE has moved from the first base station to a second base station. The medium also includes instructions for determining whether the first network node should continue to act as the primary slave caching node for the UE after it has moved to the second base station and using the first network node as the primary slave caching node when the determination is that the first network node should continue to act as the primary slave caching node for the UE. The medium further includes instructions for designating a second network node as a primary slave caching node to cache content for the UE attached to a second base station when the determination is that the first network node should not continue to act as the primary slave caching node for the UE.

In a third embodiment, a system is disclosed for caching content at mesh network nodes. The system includes a first and second base station, a coordinating server, one or more primary slave caching nodes, a caching node and a UE.

A role-based system is described in which a primary cache and a secondary cache are present in a mesh, though a mesh network is not a requirement as a non-mesh network will also work. The primary cache downloads and caches content. The secondary cache synchronizes all content from the primary cache and provides failover.

In one embodiment, the roles are determined by a competitive bidding process that takes into account several factors including a number of neighbor nodes; throughput for each node; latency; number of hops; network distance, etc. Bidding can take place among CWSes, or at the LAC. A bidding protocol may be used. SON factors may also be incorporated in the bidding. For example, nodes that serve primarily video UEs may be weighted with a high score, nodes that are unreliable may be weighted with a low score. Bidding could also be used for any other role, such as: neighbor relations table handling; selection of local EPC; selection of X2 concentrator.

Other aspects and advantages of the invention will become apparent from the following drawings, detailed description, and claims, all of which illustrate the principles of the invention, by way of example only. A first mesh network node is designated as a caching node to cache content for the UE attached to the first base station. The UE moves from the first base station to the second base station. A determination is made whether the first mesh network node should continue to act as a caching node for the UE after it has moved to the second base station and the first mesh network node is used as the caching node when the determination is that the first mesh network should continue to act as the caching node for the UE. The second mesh network node is designated as the caching node to cache content for the UE attached to the second base station when the determination is that the first mesh network should not continue to act as the caching node for the UE.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Caching data various types of data (for example video data) is useful for reducing latency. A video cache for the UE is generally implemented either as a master cache in the core network or as a split cache in the core network and radio access network (RAN). A video cache can aid in reducing latency as compared to the scenario where there is no cache however, this there may still be latency issues. For example, video caching at any particular node may be limited by insufficient number of intra-node links or insufficient bandwidth. Also, when nodes enter and exit, there may be a need to reallocate the caching node.

While the following description is explained with respect to video caching, it should be understood that caching of other types of data could also be implemented. These other types of data may include audio services, phone services, emergency services (rescue, fire, natural disaster etc.). safety-critical applications such as remote surgery where availability issues can be hazardous, network operations support systems for customers' business critical needs and online games where real-time lag can be a factor. It is further noted that the reduction of latency may be a critical component in 5G networks.

The presently described method, apparatus and software for caching content at mesh network nodes includes assigning a first network node as a primary slave caching node to cache content for a user equipment (UE) attached to a first base station. A determination is made that the UE has moved from the first base station to a second base station, and a determination is made whether the first network node should continue to act as the primary slave caching node for the UE. When the determination is made that the first network node should not continue to act as the primary slave caching node for the UE, a second network node is designated as the primary caching node to cache content for the UE attached to a second base station. The determination may be based on number of nodes in the network, throughput available at each node, number of users serviced by each node, latency, number of hops, network distance, physical storage capacity, etc.

Figure 1:
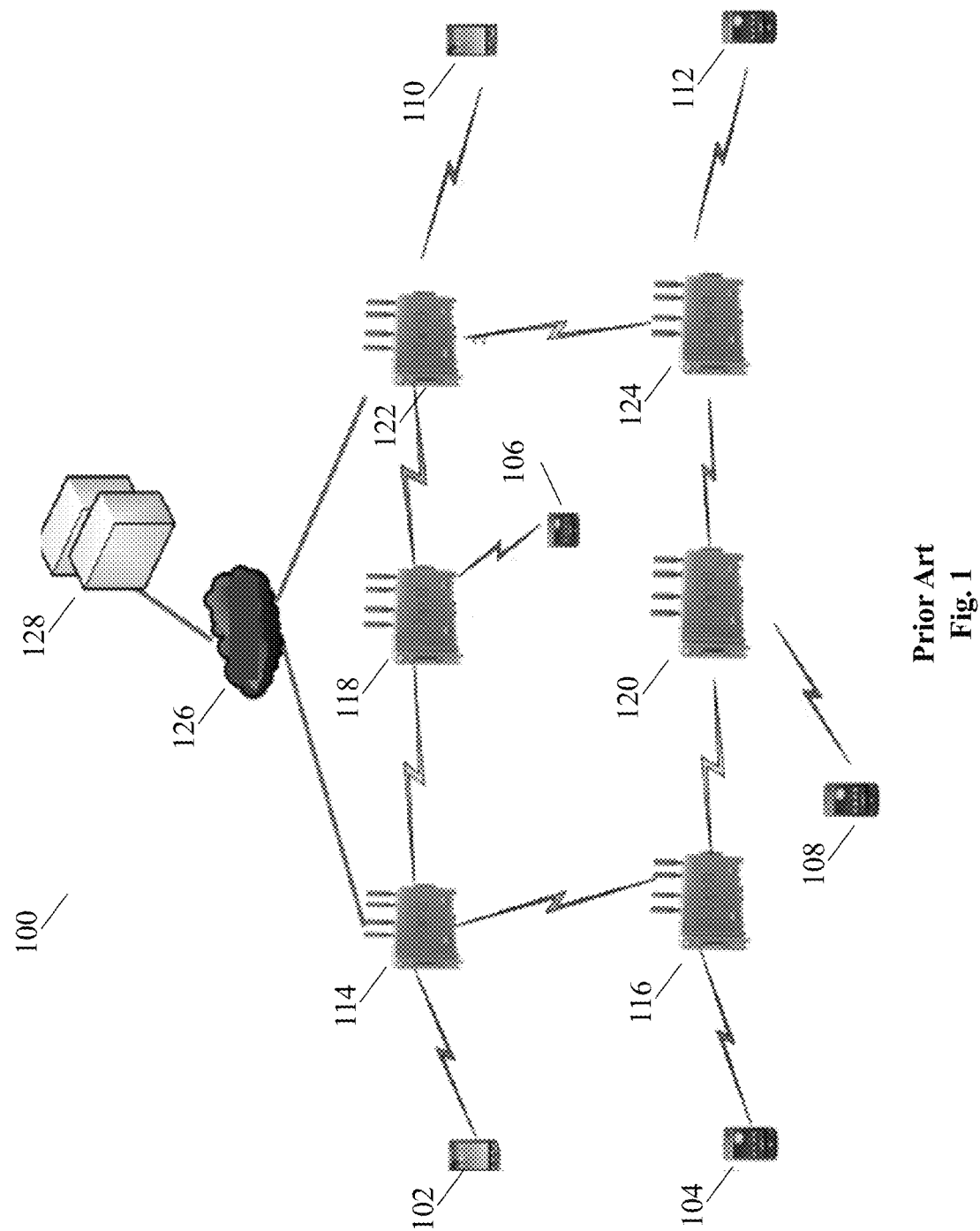
FIG. 1 depicts a prior art diagram of a UniRAN deployment.

FIG. 1 shows a typical deployment environment 100 for a UniRAN in an operator network, as is known in the art. The environment includes a collection of UEs 102, 104, 106, 108, 110 and 112. Each UE is connected to a respective base station 114, 116, 118, 120, 122, and 124. Also shown is a Uni Cloud 126 connecting from base stations to a core network 128. When the UniRAN functions as a gateway node, it has access to an inter-connect through which it establishes connectivity to the cloud. The interconnect may be wired or wireless (e.g. LTE). When the UniRAN functions as a mesh node, the UniRAN has no direct connection to the core or infrastructure provider network. The only means of connecting to the network is over mesh-links.

Figure 2:
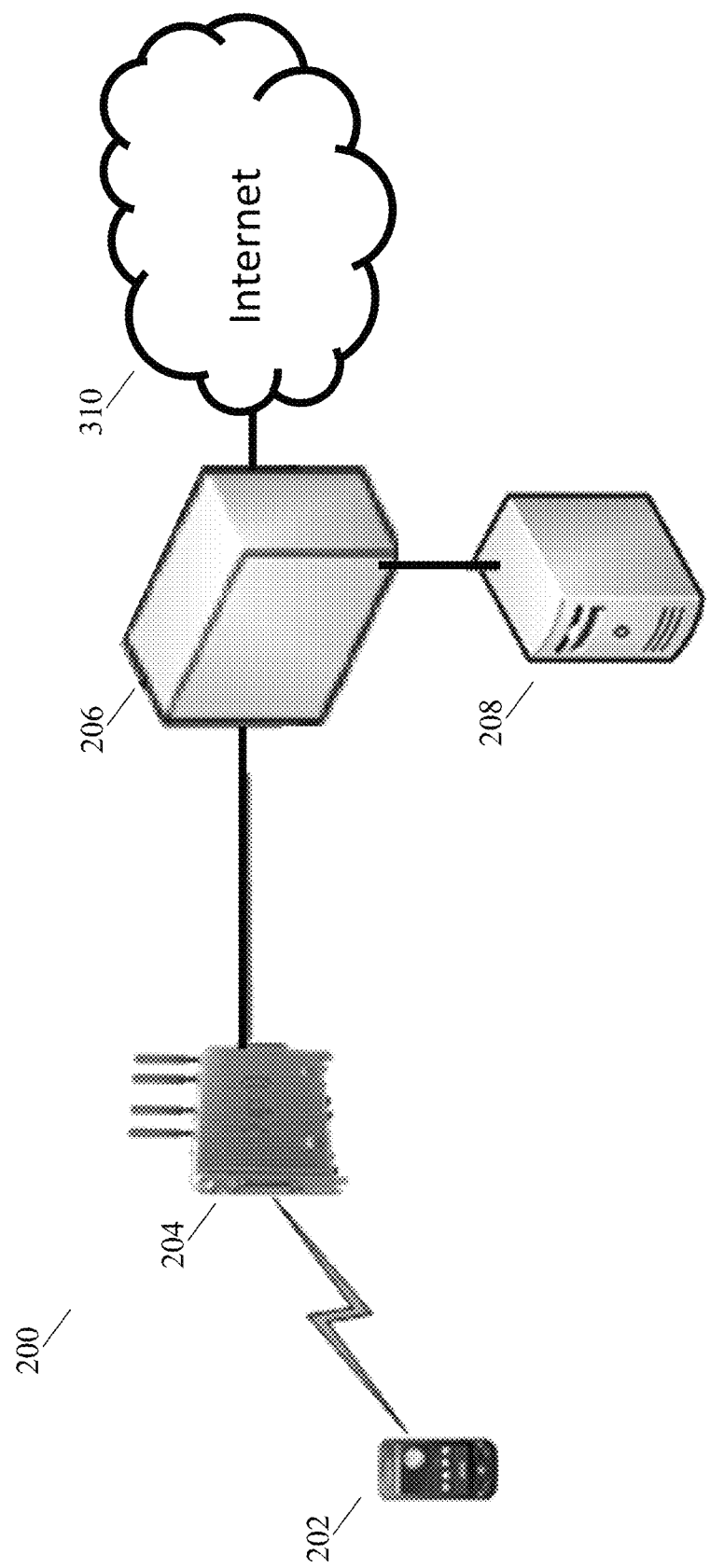
FIG. 2 depicts a prior art diagram of a master cache in a core network.

FIG. 2 shows a typical deployment environment 200 showing a master cache in a core network, as is known in the art. The environment 200 includes a UE 202 in communication with a base station 204. An EPC 206 is shown in communication with the base statin 204, a cache 208 and the Internet 210. In this example, the video cache for the UE is implemented as a master cache in the core network. The master cache is where unencrypted data from the PGW is visible or a DPI technique may be used, which reduces latency as compared to the scenario where there is no cache or where the cache is maintained at the content hosting site/server. This scenario suffers from latency related issues.

Figure 3:
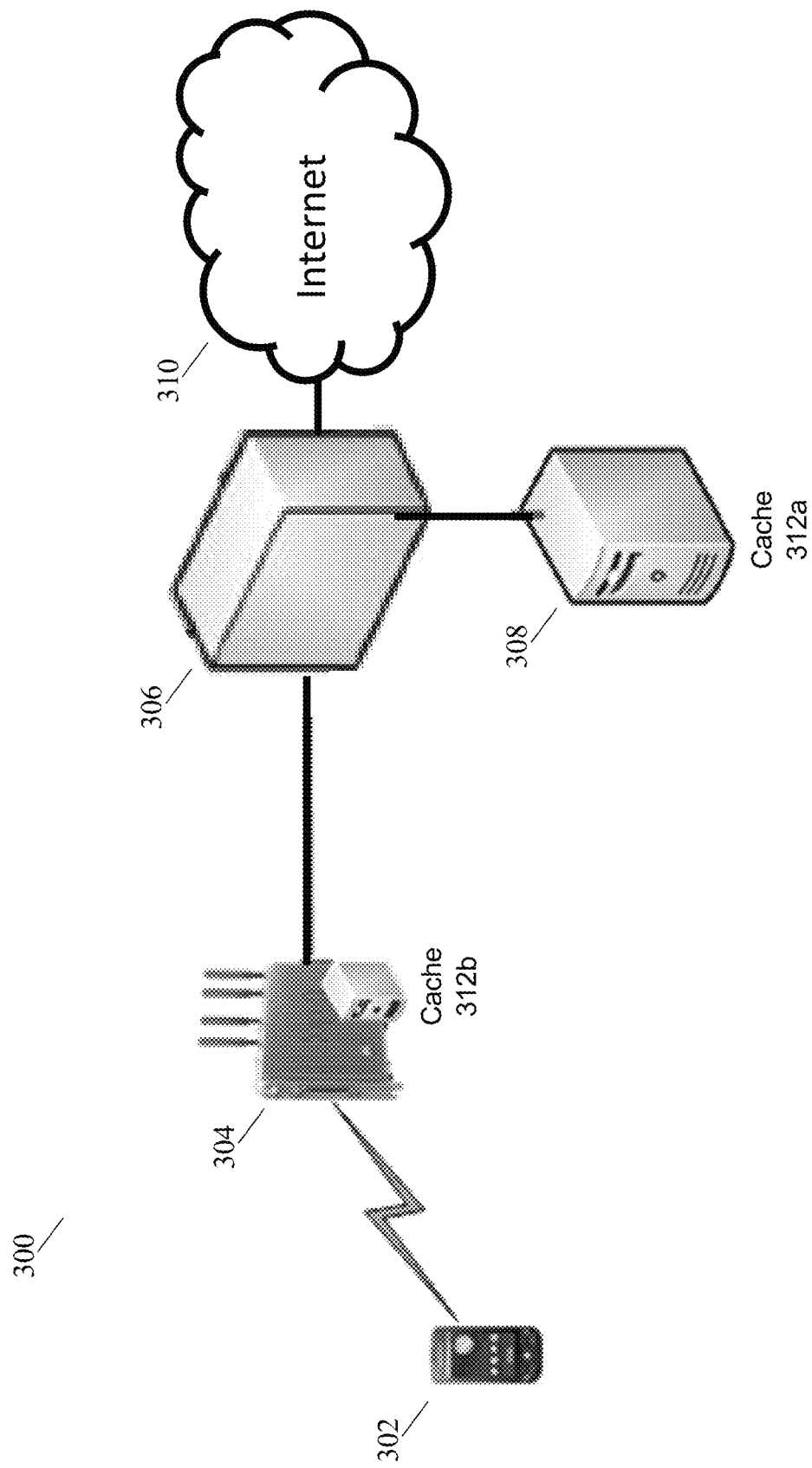
FIG. 3 depicts a prior art diagram of a split cache in a core network.

FIG. 3 shows a typical deployment environment 300 showing a split cache, as is known in the art. The environment 300 includes a UE 302 in communication with a base station 304 which is in communication with a slave cache 306 which is part of a split cache. An EPC 308 is shown in communication with the base station 304, a master cache 310 also part of the split cache, and the Internet 312. The use of a split cache addresses the latency issues experienced when using a single level cache maintained in the core (FIG. 2). This scenario can also work in case of a network where the eNodeB moves with the UE as in some vehicular implementations. However, this mode is limited to a macro eNodeB based network where handovers are extremely few as in the case of handover, the entire cache needs to be purged. This does not work well for a small cell network.

This presently described method and system for caching solves this issue for a small cell network organized in a mesh topology. A coordination server, also referred as LTE Access Controller (LAC), behaves as a mesh manager/controller for a small cell network. The coordination server controls a mesh network where routing throughout the small cell network is optimized periodically. With this optimization the mesh does not behave like a pure ad-hoc network but an intelligent mesh where performance and characteristics approach a managed static network. The coordination server behaves as or controls the primary cache in the core network.

Figure 4:
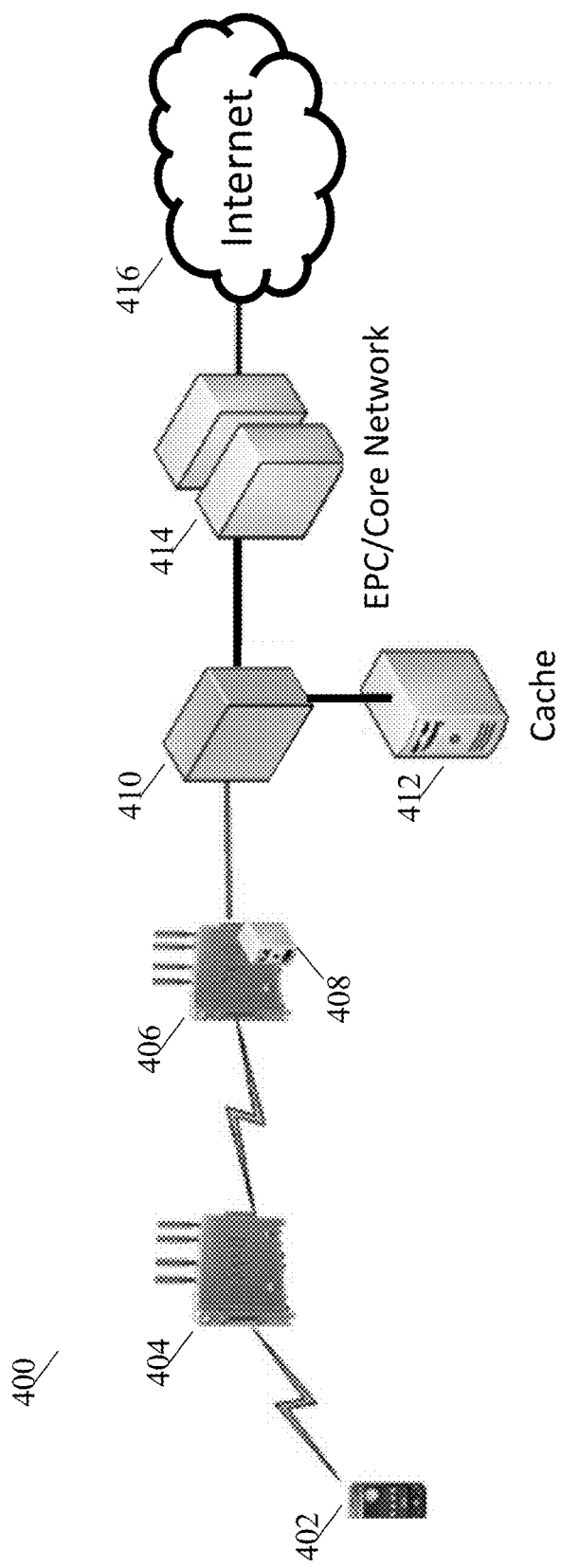
FIG. 4 depicts a diagram of a split cache in a core network, in accordance with some embodiments.

Referring to FIG. 4, a deployment environment 400 is shown. The environment 400 includes a UE 402 in communication with a base station 404 which is ii communication with a base station 406. Base station 406 is in communication with a slave cache 408. A coordination server 410 is shown in communication with base station 406 and master cache 412. An EPC core network 414 is in communication with the coordination server 410 and with the Internet 416.

As the coordination server also manages the mesh, the point at which it does the periodic optimization of routing, it is also in a position to designate the primary slave-cache at a node in the mesh based on cumulative traffic flows for a small-cell. At this point the coordination server may also designate a secondary slave-cache at an alternate node. If required, the coordination server may also introduce a tertiary cache in the network at an intermediate mesh-node for a larger mesh.

The coordination server can decide to change the designated caching nodes at a rate slower than the routing optimization rate. It could do this to save on the traffic flow generated while moving the cache. One of the primary criteria used in such a case would be elasticity in the latency for the flows. The lowest bound would be determined by the latency for static UEs where the cache is maintained at the serving eNodeB, and the high-bound would be determined by the latency expected where there is no slave cache.

The process of moving the cache within the mesh should never be worse than the scenario described earlier. Thus, moving the cache within the mesh offers flexibility required in the mesh network of base stations. The proposed solution provides benefit of selecting the mesh network node having sufficient number of intra-mesh links and/or sufficient bandwidth for caching the content to be streamed to the user equipments. Additionally, since the coordination server manages the mesh network nodes, the coordinating server is up-to-date about the base station that was caching the content and leaving the mesh network. The coordination server, therefore, may move the cache content to another base station in the mesh network and update the IP addresses for UE and other processes for the most recent base station used as a content cache server.

As shown in FIG. 4, the coordination server or the LAC decides to designate the Gateway node-1 as the primary slave-cache for all the UEs attached to node-2. As the gateway node-1 is the anchoring node for multiple such nodes, when the UE moves from node-2 to node-3 (not shown in the FIG. 4) which is also anchored at node-2, no cache changes happen. Thus, a UE in general is able to roam over a larger area than a typical small-cell, with similar caching benefits as a macro-cell network.

Figure 5:
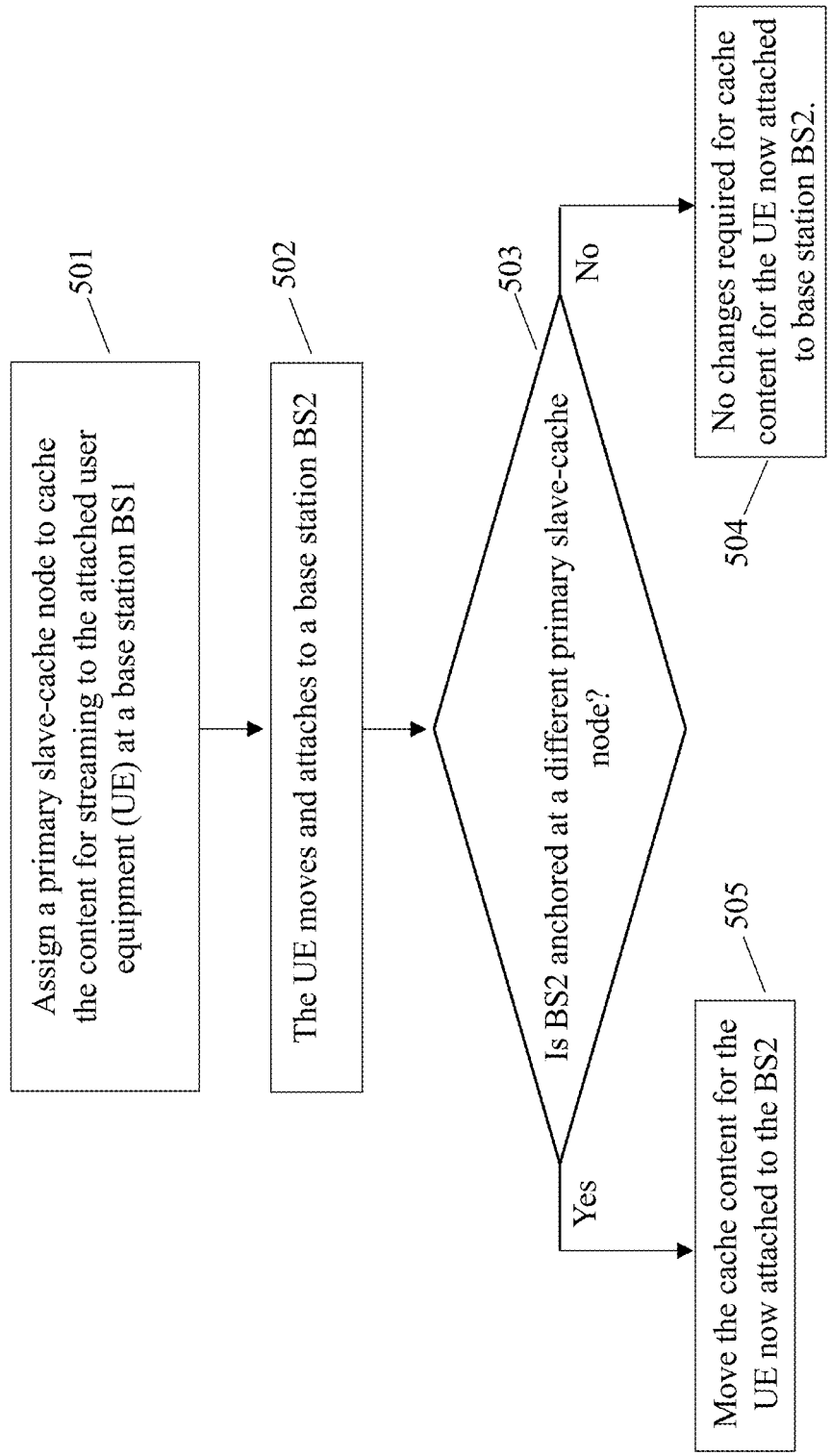
FIG. 5 depicts a flowchart of a method for providing role assignment for caching, in accordance with some embodiments.

A flow diagram of a particular embodiment is shown in FIG. 5. The process 500 begins at step 501, assign a gateway mesh node node-1 as a primary slave-cache server to stream the cached content to the attached user equipment (UE) at a base station e.g. node-2. At step 502, the UE moves and attached another base station e.g. node-3. At step 503, if the base station (node-3) now serving the UE is also anchored at gateway node-1, no change is required for cache content, as shown at step 504. However, if the user equipment is being served by a base station node-3 not anchored at node-1, the content needs to be cached at the different anchoring node, as shown at step 505.

Figure 6:
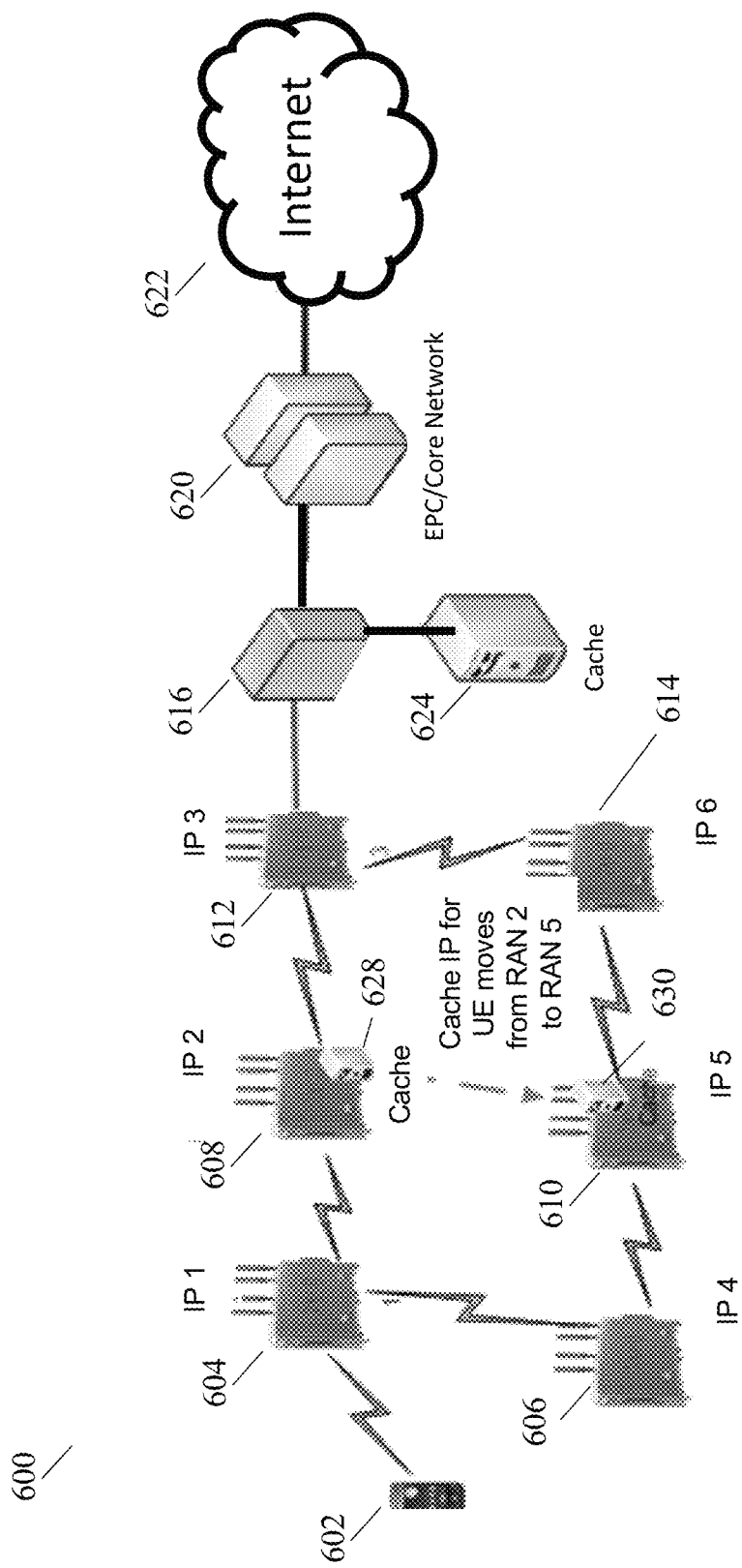
FIG. 6 depicts a diagram of an overlay cache network, in accordance with some embodiments.

FIG. 6 shows an overlay cache network 600 where the slave-cache is per eNodeB rather than a (group of) UE(s). A UE 602 is in communication with a first eNodeB of a mesh of eNodeBs. The mesh of eNodeBs includes eNodeBs 604, 606, 608, 610, 612 and 614. The mesh is in communication with coordinating server 616. An EPC/Core network 620 is in communication with coordinating server 616 and Internet 622. A split cache is shown as master cache 626 and slave cache 628. Also shown is slave cache 630 which is implemented for a UE move from RaN-2 to Ran-5 in this example.

In an LTE network the UE traffic is tunneled so it is not easy to move traffic to move caches around using a single layer mesh. Thus, here we overlay another network on the mesh specifically for cache use. The IPs of this overlay network are moved around the mesh as needed, while maintaining the binding to the UEs.

In this overlay network, an IP address is associated with each primary and secondary slave-cache in the network. Each such pair could serve either a single UE or a group of UEs with similar mobility and location characteristics. The coordination server or the LAC would maintain a table to bind UE and the cache-IP. An example of the table to bind UE and the cache mesh node's IP address is shown below.

TABLE 1

Mapping Table for UE to Cache Mesh Node IP Address

| UE Identifier | Cache Mesh Node Active IP Address | Cache Mesh Node Standby IP Address | Cache Mesh Node Virtual IP Address |
|---|---|---|---|
| 083901136446086127 | 10.0.0.1 | 10.0.0.2 | 10.0.0.3 |

The UE Identifier could be any identifier such as MEID, IMEI, IMSI, etc. The example above uses IMSI as the UE Identifier.

When the LAC determines that it needs to move the slave-caches in the network it just moves the IP address for the secondary-cache to the new mesh node and moves the cache to it. It could also allocate a new server address to which it would force the former secondary to sync to before updating the new secondary location at the primary. At this point, if desired a virtual switchover between the primary and secondary slaves could be performed. A mapping table at the LAC would allow for a UE cache to move to a different server if latency thresholds are hit.

As shown in the Table 1 above, there may exist a primary and secondary/slave base station providing the content to the user equipments. While, the primary base station performs the main role of downloading and storing the content for streaming, the secondary base station may synchronize itself with the primary and may assume the role of primary base station for content streaming and storing in the case when primary base station fails. Any standard protocol for synchronization may be used between primary and secondary base station for content synchronization.

There may be a heartbeat mechanism between the primary and the secondary base station to detect failure and decide when to perform role switch. Additionally, the decision of which base station may be primary base station may be either hardcoded or may be decided based on start-up sequence and negotiation between the primary and the secondary base station. In alternate, the coordination server may act as an arbitrator and decide the primary and secondary base station. The coordination server or the base stations may decide primary base station based on number of nodes in the mesh network, throughput available at each node, number of users serviced by each node, latency, number of hops, network distance, physical storage capacity, etc. The primary and secondary base stations, or the coordination server, may use bidding protocol in role determination. While bidding protocol may be used for primary role determination for content caching and streaming, the bidding protocol may be used for role determination for other functions such as neighbor relations table handling, selection of local EPC, selection of local concentrator, etc.

The base stations and the coordination server may also use the features of self-organizing network module for dynamic feature update, role swap, etc. For example, the nodes that are primarily serving video user equipments may be weighted with a higher score in role determination. Similarly, if the node is unreliable or with high mobility and frequently changing location or joining and leaving the mesh network at higher rate may be given lower score in deciding primary role. In some embodiments, the table may be managed of current active UE transmission sessions and may be maintained during failover.

Figure 7:
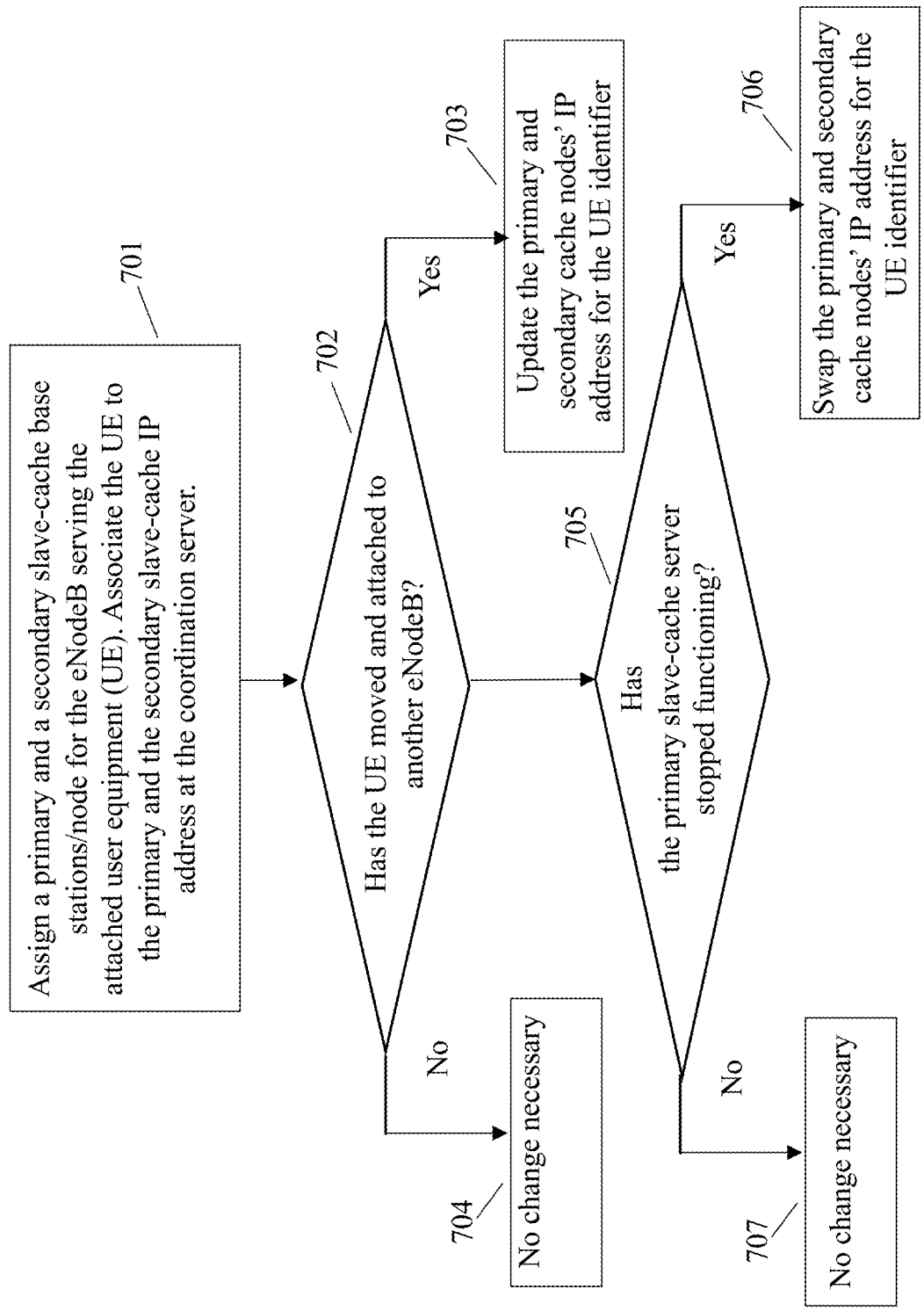
FIG. 7 depicts a flowchart of a second method for providing role assignment for caching, in accordance with some embodiments.

As described in FIG. 7, at step 701, a primary and a secondary slave-cache base station/mesh node for the eNodeB (e.g. eNodeB-1) is assigned at the coordination server. The user equipment attached to eNodeB will be served by the primary and the secondary slave-cache mesh nodes, based on the association of the UE identifier and the primary and the secondary slave-cache base station/mesh node's IP address, where the association is stored in a table as shown in Table 1 above at the coordination server. If the UE moves and attaches to another eNodeB (e.g. eNodeB-2) as shown at step 702, the Table 1 shown above will be updated with the IP addresses for the primary and the secondary mesh nodes' IP address for the eNodeB-2 as shown at 703. At step 705, if the primary/active cache server has encountered a problem and is unable to perform the role as an active or primary cache server, as shown at step 706, primary and secondary mesh nodes' IP addresses are swapped i.e. secondary cache mesh node becomes active and previously active cache mesh node becomes secondary server. However, at step 702, if UE has not moved and not attached to another eNodeB, or at step 705, the primary server is acting as expected, no change is necessary as shown at step 704 and 707.

The following example may be useful to understand how to use the disclosure made in the present application. For example, UE1 is being serviced by a base station BS1. The base station BS1 and base station BS2, base station BS3 and base station BS4 may be nodes in the mesh network, where base station BS4 may provide access to the core network. The content to be streamed to the UE1 may be stored at BS2 as a primary cache server and BS3 as a secondary cache server. BS2 and BS3 may negotiate the primary and secondary role using the bidding protocol, or the coordination server managing this mesh network of base stations BS1, BS2, BS3, and BS4 may determine primary and secondary cache server based on various factors described above. If the BS2 fails for any reason or streaming from BS2 to UE1 connected to BS1 may be having latency related issues or other issues affecting quality of streaming, the coordination server, or the BS2 and BS3 may renegotiate the primary role causing the IP address of the primary and secondary cache server updated. Additionally, BS2 and BS3 may synchronize the content stored using synchronization protocol.

Figure 8:
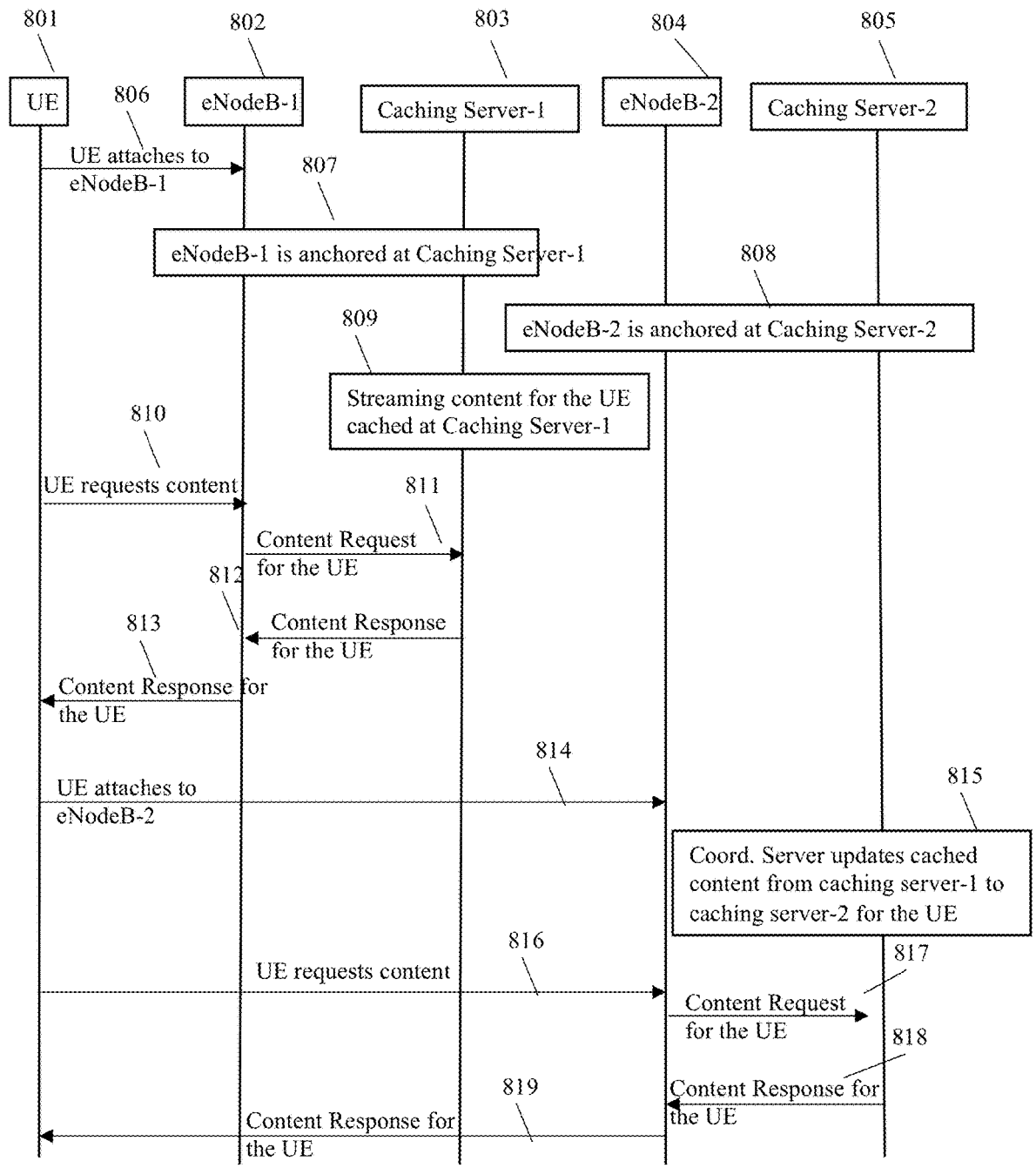
FIG. 8 is a diagram showing communication flow, in accordance with some embodiments.

As shown in FIG. 8, UE 801 attaches to an eNodeB eNodeB-1 802 at 806. The eNodeB-1 802 is anchored at a caching server caching-server-1 803 as shown at 807 and an eNodeB eNodeB-2 804 is anchored at a caching server caching-server-2 805 as shown at 808. As shown at 809, content to be streamed to the UE 801 is cached at the caching server 803. When the UE sends request for content to the eNodeB 802 as shown at 810, the eNodeB 802 forwards the request to the caching server 803 as shown at 811. The caching server 803 streams the content or sends the response with content to be streamed to the eNodeB 802 as shown at 812. The eNodeB 802 streams the content to the UE 801 as shown at 813. As shown at 815, when UE moves and subsequently attaches to eNodeB 804 as shown at 814, the coordination server updates the cached content from caching server 803 to the caching server 804 for the UE 801. As shown at 816, when the UE sends request for content to eNodeB 804, the eNodeB 804 forwards the request for content to the caching server 805, as shown at 817. Upon receipt of response from the caching server 805 at the eNodeB 804 as shown at 818, the eNodeB 804 streams the requested content to the UE 801 as shown at 819.

Figure 9:
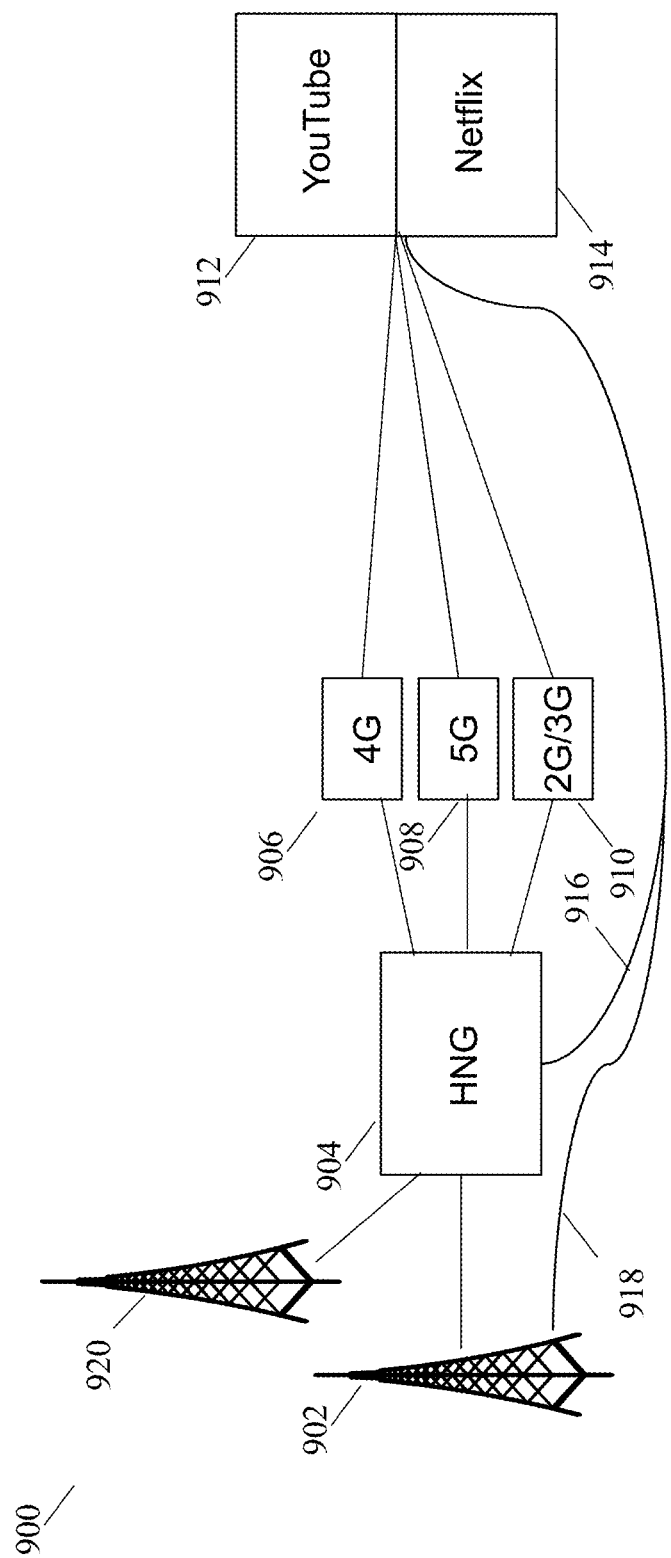
FIG. 9 is a diagram of a networking showing breakout in accordance with some embodiments.

FIG. 9 is a network diagram showing the concept of local breakout. Local breakout refers to a mechanism wherein IP data can be routed to a destination from the source over the Internet, without going through a cellular core network gateway as an intermediate node or nodes. As base stations are often provisioned with a connection to the public Internet for backhaul purposes, local breakout is often possible for handling generic Internet traffic, as well as voice, RTP, or real-time traffic in certain scenarios. Local breakout can greatly reduce network latency in a wireless network by making many connections more direct, which is especially important in the implementation of 5G networks.

Base stations 902 and 920 are in communication with an HNG 904. HNG 904 communicates with a video service 912 or 914 by way of a 4G core network connection 906, a 5G core network connection 908 or a 2G/3G core network connection 910, or any other core network or combination thereof. In this example base station 902 and base station 920 are bidding against each other to act as a primary video caching server as described elsewhere herein. The determination regarding which base station obtains the video caching role may take into account several factors, including but not limited to, the amount of latency between the base station and the video service. In this example, base station 902 has lower latency to the video service than base station 920, and base station 902 is awarded the primary cache role. A breakout connection 916 is shown from HNG 904 to video services 912 (YouTube) and 914 (Netflix)—these video services are representative and any other video services accessed over the public Internet could be considered. A breakout connection 918 is also shown from base station 902 to video service 912 and 914. In the case of video caching for a video server that is located within a carrier core network, the caching server role may be awarded to the base station with a better connection to the core and not to the public Internet; different base stations may provide caching for different video services, in some embodiments.

Figure 10:
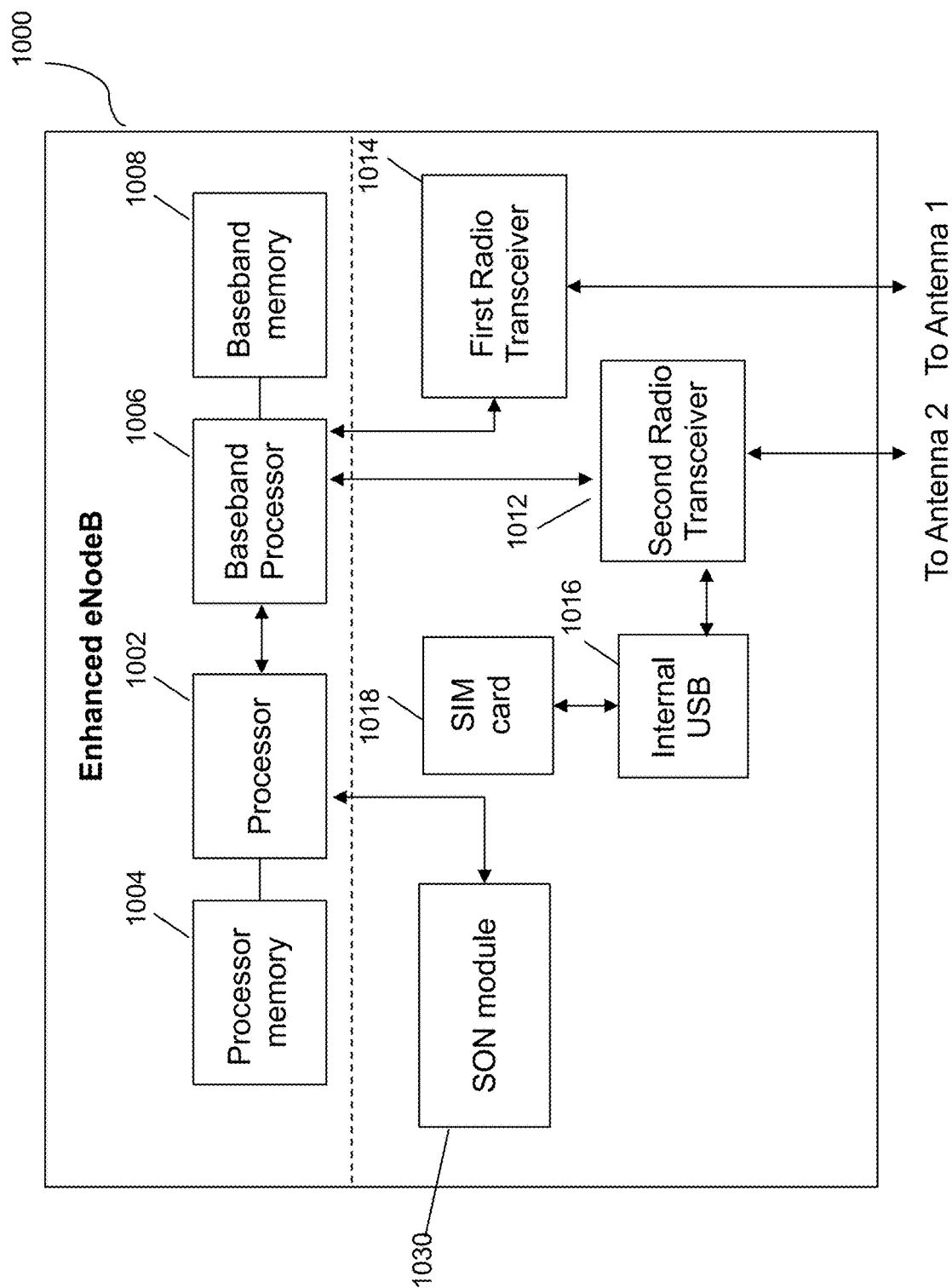
FIG. 10 is a diagram of an eNodeB, in accordance with some embodiments.

FIG. 10 is a schematic diagram of an enhanced base station, in accordance with some embodiments. Enhanced base station 1000 may be an eNodeB for use with LTE, and may include processor 1002, processor memory 1004 in communication with the processor, baseband processor 1006, and baseband processor memory 1008 in communication with the baseband processor. Enhanced eNodeB 1000 may also include first radio transceiver 1010 and second radio transceiver 1012, internal universal serial bus (USB) port 1016, and subscriber information module card (SIM card) 1018 coupled to USB port 1014. In some embodiments, the second radio transceiver 1012 itself may be coupled to USB port 1016, and communications from the baseband processor may be passed through USB port 1016.

Processor 1002 may communicate with an upstream gateway via self-organizing network (SON) coordination module 1031, which may perform the buffering, flow control, radio congestion identification, X2AP communication, and other functions described herein. The SON module may be configured to provide transmit power increase/decrease functionality, radio band switching functionality, or communications with another remote SON module providing, for example, these types of functionality, in some embodiments.

Baseband processor 1006 may generate and receive radio signals for both radio transceivers 1010 and 1012, based on instructions from processor 1002. In some embodiments, processors 1002 and 1006 may be on the same physical logic board. In other embodiments, they may be on separate logic boards.

The first radio transceiver 1010 may be a radio transceiver capable of providing LTE eNodeB functionality, and may be capable of higher power and multi-channel OFDMA. The second radio transceiver 1012 may be a radio transceiver capable of providing LTE UE functionality. Both transceivers 1010 and 1012 are capable of receiving and transmitting on one or more LTE bands. In some embodiments, either or both of transceivers 1010 and 1012 may be capable of providing both LTE eNodeB and LTE UE functionality. Transceiver 1010 may be coupled to processor 1002 via a Peripheral Component Interconnect-Express (PCI-E) bus, and/or via a daughtercard. As transceiver 1012 is for providing LTE UE functionality, in effect emulating a user equipment, it may be connected via the same or different PCI-E bus, or by a USB bus, and may also be coupled to SIM card 1018.

SIM card 1018 may provide information required for authenticating the simulated UE to the evolved packet core (EPC). When no access to an operator EPC is available, local EPC 1020 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1000 is not an ordinary UE but instead is a special UE for providing backhaul to device 1000.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1010 and 1012, which may be Wi-Fi 1002.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1002 for reconfiguration.

Other elements and/or modules may also be included, such as a home eNodeB, a local gateway (LGW), etc. Additional radio amplifiers, radio transceivers and/or wired network connections may also be included.

Processor 1002 and baseband processor 1006 are in communication with one another. Processor 1002 may perform routing functions in conjunction with backhaul/routing coordination module 1030, and may determine if/when a switch in network configuration is needed. Routes, backhaul information, and other information may be stored in module 1030 or in a database, table, or in-memory data structure in memory 1003.

Processor 1002 may identify the appropriate network configuration, and may perform routing of packets from one network interface to another accordingly. Processor 1002 may use memory 1004, in particular to store a routing table to be used for routing packets, and may use memory 1004 to store one or more routing table of routing coordination module 1030. Routes may be pushed to other mesh nodes as required by rules in backhaul/routing coordination module 1030 or based on instructions received at SON coordination module 1031 from other nodes or from an upstream coordinating server.

Baseband processor 1006 may perform operations to generate the radio frequency signals for transmission or retransmission by both transceivers 1010 and 1012. Baseband processor 1006 may also perform operations to decode signals received by transceivers 1010 and 1012. Baseband processor 1006 may use memory 1008 to perform these tasks.

Figure 11:
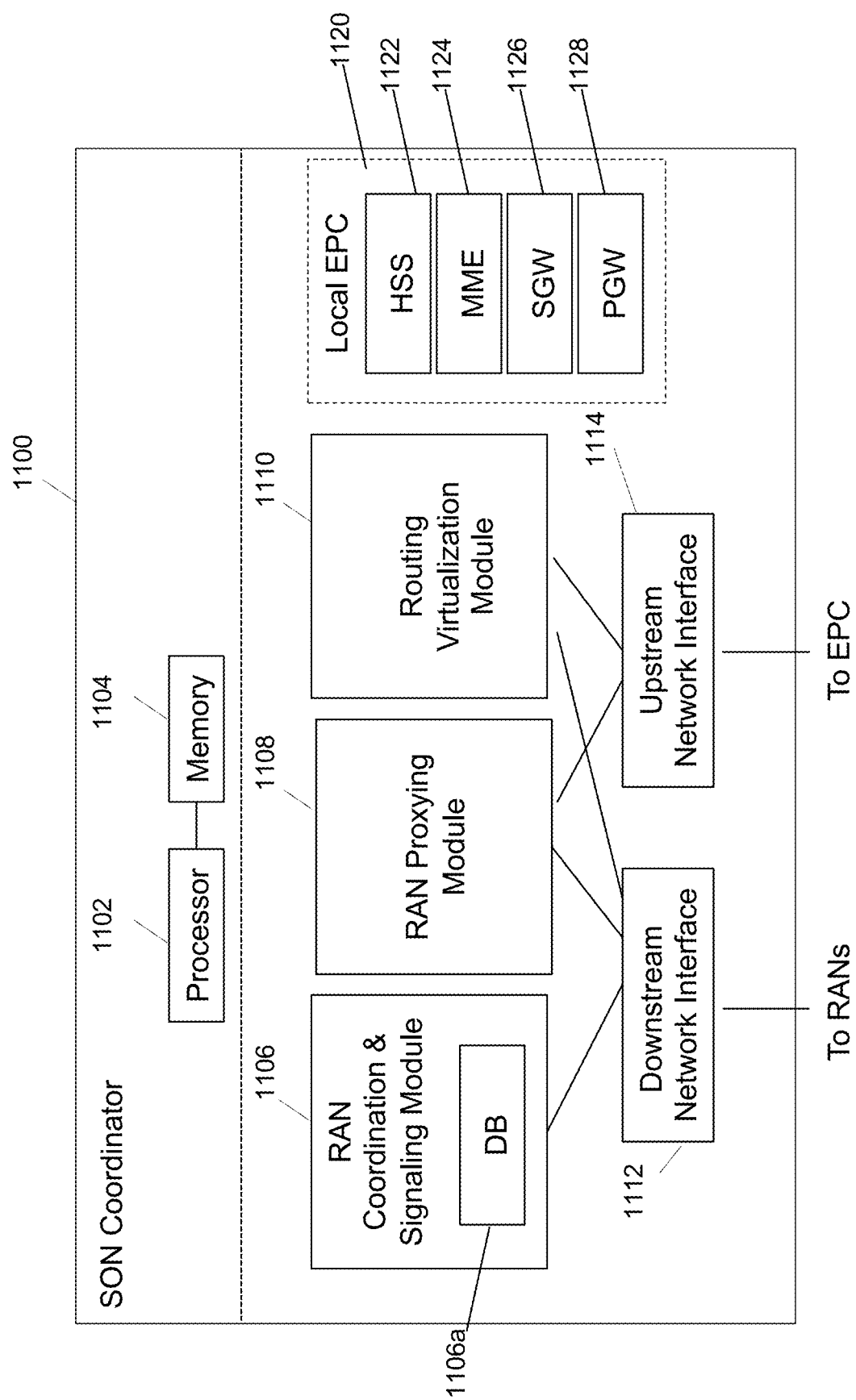
FIG. 11 is a diagram of a coordination server, in accordance with some embodiments.

FIG. 11 is a schematic diagram of a coordination gateway, in accordance with some embodiments. Coordinating gateway 1100 includes processor 1102 and memory 1104, which are configured to provide the functions described herein. Also present are radio access network coordination/X2/X2+ signaling (RAN Coordination and signaling) module 1106, back to back user agent (B2BUA) and media buffer 1108, and core network virtualization module 1110. In some embodiments, coordinator server 1100 may coordinate multiple RANs using coordination module 1106. In some embodiments, coordination server may also provide proxying, routing virtualization and RAN virtualization, via module 1110. In some embodiments, buffering and proxying of media may be performed by module 1108. In some embodiments, a downstream network interface 1112 is provided for interfacing with the RANs, which may be a radio interface (e.g., LTE), and an upstream network interface 1114 is provided for interfacing with the core network, which may be either a radio interface (e.g., LTE) or a wired interface (e.g., Ethernet). Signaling suppression functions as described within may be performed in module 1106.

Coordinating gateway 1100 includes local evolved packet core (EPC) module 1120, for authenticating users, storing and caching priority profile information, and performing other EPC-dependent functions when no backhaul link is available. Local EPC 1120 may include local HSS 1122, local MME 1124, local SGW 1126, and local PGW 1128, as well as other modules. Local EPC 1120 may incorporate these modules as software modules, processes, or containers. Local EPC 1120 may alternatively incorporate these modules as a small number of monolithic software processes. Modules 1106, 1108, 1110 and local EPC 1120 may each run on processor 1102 or on another processor, or may be located within another device.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

While the examples are described with respect to a mesh network, it should be understood that the same concepts apply to a non-mesh network. Where the word "mesh" is used herein, it is understood to mean any collection of nodes that have dynamic routing characteristics, including statically-planned nodes with wireless backhaul (such backhaul links have rapidly changing characteristics) as well as statically planned nodes with static backhaul where nodes are anticipated to become more congested, causing them to become more or less available; in other words, the video caching role assignment procedure described herein is applicable to any general selection of nodes in a cellular communication network. The RF tower may be statically or dynamically planned, however in either case the video caching roles can be self-configuring. The system works in any RAT or multi-RAT environment, including but not limited to 5G with video caching role assignment taking place at the edge of the network.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections. Code may be written in any combination of programming languages or machine-readable data formats, each suitable to its particular application, including but not limited to: C, C++, Java, Python, Ruby, R, Lua, Lisp, Scala, JSON, JavaScript, YAML, XML, HTML, etc. Services may be RESTful and may be implemented using generic hooks, including over HTTP, HTTPS, SCTP, IP, TCP, JSON, JavaScript, etc., as well as via inter-process communication on one or more real or virtual machines or containers, e.g., IPC, shared memory, shared filesystem, UNIX pipes and the like. A Linux or POSIX environment may be used. Containers may be Docker, Jetty, Tomcat, Wildfy, Springboot, LXD, unikernels, OpenVZ, RKT, Windows Server, Hyper-V, or any other type of container, or may be, in some embodiments, virtual machines or images, etc. Network access may be relied upon or may be avoided, in various embodiments. A networking fabric may be provided among the different containers, in some embodiments. As is well-known, the benefit of using cloud infrastructure is that it is simple to mix heterogeneous resources and to scale services up or down based on load and desired performance.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The subject matter described in this specification can be implemented using client-side applications, web pages, mobile web pages, or other software as generally known in the art and that would be usable to end-user customers (for community self-managed RAN apps) and/or mobile operator end users. The subject matter could alternately be delivered or implemented using an API, such as a SOAP API, a JSON API, a RESTful API, in lieu of or in conjunction with a direct end-user interface. The subject matter could use messaging queues, webhooks, server-side containers, or any other technology known in the art.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server. Any database could be used (SQL, NoSQL, temporal, key-value, etc.). Any container orchestration technology (Kubernetes, Docker Swarm) could be used.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, cloud topology could vary and public and private cloud services could be mixed; certain services could be provided by containers while other services could be provided by dedicated machines or virtual machines or virtual network functions (for example, a data sink could be a traditional billing server); wireless network topology can also apply to wired networks, optical networks, and the like; etc. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

What is claimed is:

1. A method for caching content at network nodes, comprising:
    configuring an overlay network with overlay network addresses for use by a caching network;
    assigning a first network node as a primary slave caching node to cache content for a user equipment (UE) attached to a first base station, the first network node being selected for having sufficient number of links or sufficient bandwidth for caching the content to be streamed to the UE at a first time;
    determining, by a coordinating server, the UE has handed over from the first base station and is presently attached to a second base station;
    determining, by the coordinating server, whether the first network node should continue to act as the primary slave caching node for the UE after it has moved to the second base station;
    continuing use of the first network node as the primary slave caching node when the determination is that the first network node should continue to act as the primary slave caching node for the UE; and
    designating a second network node as the primary slave caching node to cache content for the UE attached to a second base station when the determination is that the first network node should not continue to act as the primary slave caching node for the UE and that the second network node being selected for having sufficient number of links or sufficient bandwidth for caching the content to be streamed to the UE at a second time, the second network node being caused to reuse a same overlay network address of the primary slave caching node so that the UE can continue to use the same overlay network address for caching,
    wherein the first and second network nodes are located in a Radio Access Network (RAN).

2. The method of claim 1, further comprising moving the cached content from first network node to the second network node when the caching node is the second network node.

3. The method of claim 1, wherein determining, by a coordinating server, the UE has moved from the first base station to a second base station comprises determining that the second base station is anchored at a different slave caching node.

4. The method of claim 1, further comprising assigning a secondary slave caching node to cache content for the user equipment (UE).

5. The method of claim 4, further comprising associating the UE to the primary slave caching node and to the secondary slave caching node IP address at the coordinating server.

6. The method of claim 5, wherein designating a second network node as the primary caching node to cache content for the UE attached to a second base station when the determination is that the first network node should not continue to act as the primary slave caching node for the UE further comprises updating the primary and the secondary nodes IP address for the UE identifier.

7. The method of claim 5, further comprising determining whether the primary slave caching node has stopped functioning, when the determination is that the primary slave caching node has not stopped functioning then refraining from changing anything, and when the determination is that the primary slave caching node has stopped functioning then swapping the primary and secondary caching nodes IP address for the UE identifier.

8. A non-transitory computer-readable medium containing instructions which, when executed, cause a system to perform steps comprising:
    configuring an overlay network with overlay network addresses for use by a caching network;
    assigning a first network node as a primary slave caching node to cache content for a user equipment (UE) attached to a first base station, the first network node being selected for having sufficient number of links or sufficient bandwidth for caching the content to be streamed to the UE at a first time;

determining, by a coordinating server, the UE has moved from the first base station to a second base station;

determining, by the coordinating server, whether the first network node should continue to act as the primary slave caching node for the UE after it has moved to the second base station;

continuing use of the first network node as the primary slave caching node when the determination is that the first network node should continue to act as the primary slave caching node for the UE; and designating a second network node as the primary slave caching node to cache content for the UE attached to a second base station when the determination is that the first network node should not continue to act as the primary slave caching node for the UE and that the second network node being selected for having sufficient number of links or sufficient bandwidth for caching the content to be streamed to the UE at a second time, the second network node being caused to reuse a same overlay network address of the primary slave caching node so that the UE can continue to use the same overlay network address for caching, wherein the first and second network nodes are located in a Radio Access Network (RAN).

9. The computer-readable medium of claim 8, further comprising instructions for moving the cached content from first network node to the second network node when the caching node is the second network node.

10. The computer-readable medium of claim 8, further comprising instructions wherein determining, by a coordinating server, the UE has moved from the first base station to a second base station comprises determining that the second base station is anchored at a different slave caching node.

11. The computer-readable medium of claim 8, further comprising instructions for assigning a secondary slave caching node to cache content for the user equipment (UE).

12. The computer-readable medium of claim 11, further comprising instructions for associating the UE to the primary slave caching node and to the secondary slave caching node IP address at the coordinating server.

13. The computer-readable medium of claim 12, further comprising instructions wherein designating a second network node as the primary slave caching node to cache content for the UE attached to a second base station when the determination is that the first network node should not continue to act as the primary slave caching node for the UE further comprises updating the primary and the secondary nodes IP address for the UE identifier.

14. The computer-readable medium of claim 12, further comprising instructions for determining whether the primary slave caching node has stopped functioning, when the determination is that the primary slave caching node has not stopped functioning then refraining from changing anything, and when the determination is that the primary slave caching node has stopped functioning then swapping the primary and secondary caching nodes IP address for the UE identifier.

15. A system for caching content in a cellular telecommunications network, comprising:

a processor at a coordinating server in the telecommunications network;

a memory electrically coupled to the processor;

a first network node acting as a base station and assigned as a primary slave caching node to cache content for a user equipment (UE) attached to a first base station, the first network node being selected for having sufficient number of links or sufficient bandwidth for caching the content to be streamed to the UE at a first time, the first network node having a first overlay network address for use for caching purposes; and a second network node acting as a base station and as a caching node and communicatively coupled with the first network node and the coordinating server, the coordinating server for determining the UE has moved from the first base station to a second base station and determining whether the first network node should continue to act as the primary slave caching node for the UE after it has moved to the second base station;

the first network node continuing use as the primary slave caching node when the determination is that the first network should continue to act as the primary slave caching node for the UE; and the second network node used as the primary caching node to cache content for the UE attached to a second base station when the determination is that the first network should not continue to act as the caching node for the UE and that the second network node being selected for having sufficient number of links or sufficient bandwidth for caching the content to be streamed to the UE at a second time, the second network node being caused to reuse a same overlay network address of the primary slave caching node so that the UE can continue to use the same overlay network address for caching, wherein the first and second network nodes are located in a Radio Access Network (RAN).

16. The system of claim 15, wherein the cached content is moved from the first network node to the second network node when the caching node is the second network node.

17. The system of claim 15, wherein determining the UE has moved from the first base station to a second base station comprises determining that the second base station is anchored at a different slave caching node.

18. The system of claim 15, wherein a secondary slave cache node is assigned to cache content for the user equipment (UE) and wherein the UE is associated to the primary slave caching node and to the secondary slave caching node IP address at the coordinating server.

19. The system of claim 18, wherein a second network node is designated as the primary caching node to cache content for the UE attached to a second base station when the determination is that the first network should not continue to act as the caching node for the UE further comprises updating the primary and the secondary nodes IP address for the UE identifier.

20. The system of claim 18, wherein when the determination is that the primary slave caching node has not stopped functioning then nothing is changed, and when the determination is that the primary slave caching node has stopped functioning then the primary and secondary caching nodes IP address is swapped for the UE identifier.

* * * * *